(12) United States Patent
Tsunokawa

(10) Patent No.: US 8,315,384 B2
(45) Date of Patent: Nov. 20, 2012

(54) INFORMATION PROCESSING APPARATUS, INFORMATION PROCESSING METHOD, AND PROGRAM

(75) Inventor: Motoki Tsunokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 997 days.

(21) Appl. No.: 12/115,844

(22) Filed: May 6, 2008

(65) Prior Publication Data

US 2008/0285944 A1    Nov. 20, 2008

(30) Foreign Application Priority Data

May 15, 2007  (JP) ................. 2007-129518

(51) Int. Cl.
*H04N 5/765*    (2006.01)
(52) U.S. Cl. ..................................... 380/234
(58) Field of Classification Search ........................ None
See application file for complete search history.

(56) References Cited

U.S. PATENT DOCUMENTS

| | | | |
|---|---|---|---|
| 2007/0230894 A1* | 10/2007 | Kimura et al. | 386/35 |
| 2009/0085762 A1* | 4/2009 | Yuki et al. | 340/691.6 |

FOREIGN PATENT DOCUMENTS

| | | |
|---|---|---|
| JP | 2008-131413 | 6/2008 |
| JP | 2008-258984 | 10/2008 |

OTHER PUBLICATIONS

Office Action issued Dec. 13, 2011, in Japanese Patent Application No. 2007-129518, filed May 15, 2007.

* cited by examiner

*Primary Examiner* — Brandon Hoffman
(74) *Attorney, Agent, or Firm* — Oblon, Spivak, McClelland, Maier & Neustadt, L.L.P.

(57) ABSTRACT

An information processing apparatus for controlling programming of a timer recording of a specific television broadcast program includes the following elements: an extracting unit configured to extract program specifying information from audio data or video data of a program; a specifying unit configured to specify a program to be timer-recorded on the basis of the program specifying information extracted by the extracting unit; a presenting unit configured to present information for prompting a user to program a timer recording of the program specified by the specifying unit; and an accepting unit configured to accept the programmed timer recording of the program specified by the specifying unit.

10 Claims, 7 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2007-129518 filed in the Japanese Patent Office on May 15, 2007, the entire contents of which are incorporated herein by reference.

BACKGROUND OF THE INVENTION

1. Field of the Invention

The present invention relates to information processing apparatuses, information processing methods, and programs, and more particularly, to an information processing apparatus, an information processing method, and a program for extracting information for specifying a program to be recorded from video data of another program and specifying the program to be recorded on the basis of the extracted information, thereby facilitating a timer recording of the program.

2. Description of the Related Art

In television broadcasting, broadcasters sometimes run programs called "program commercials" for promoting specific broadcast programs, such as special programs (hereinafter referred to as "advertised programs").

When a viewer views a program commercial advertising a specific program and becomes interested in this advertised program, the viewer can view the advertised program by selecting a channel of the advertised program at the broadcast time and date of the advertised program introduced in the program commercial. Further, the viewer can program a video recorder to record the advertised program and view the program at a later time.

Japanese Unexamined Patent Application Publication No. 2006-50671 describes a method for providing timer control information, which is multiplexed with video data of broadcast programs, for controlling a timer recording screen for accepting timer recordings and for programming timer recordings using the information.

SUMMARY OF THE INVENTION

However, when such timer control information is not multiplexed, the viewer is necessary to perform the following in order to program a timer recording of the advertised program:

Write down or memorize the title, broadcast time and date, and broadcast duration of the advertised program in a short time during the program commercial;

Switch on the video recorder;

Change the input of the television receiver to the video recorder;

Program the video recorder to record the advertised program on the basis of the information indicating the broadcast time and date or the like on a timer recording screen, or search for the advertised program on the basis of the information indicating the title or the like and program the video recorder to record the advertised program on the timer recording screen;

Change the input of the television receiver to a channel that broadcasts the advertised program; and Switch off the video recorder.

During the above operations, the viewer is incapable of viewing programs.

In the related art, programming a timer recording of an advertised program introduced in a program commercial involves complicated operations. As a result, the user may eventually gives up programming a timer recording of the advertised program and viewing the advertised program. For the broadcasters, this means that the program commercial has only a small advertising effect.

It is desirable to facilitate a timer recording of, for example, an advertised program introduced in a program commercial.

According to an embodiment of the present invention, there is provided an information processing apparatus for controlling programming of a timer recording of a specific television broadcast program. The information processing apparatus includes the following elements: extracting means for extracting program specifying information from audio data or video data of a program; specifying means for specifying a program to be timer-recorded on the basis of the program specifying information extracted by the extracting means; presenting means for presenting information for prompting a user to program a timer recording of the program specified by the specifying means; and accepting means for accepting the programmed timer recording of the program specified by the specifying means.

The specifying means may search for the program to be timer-recorded from among programs that will be broadcast on a channel on which the program from which the program specifying information has been extracted is broadcast, programs that will be broadcast on a channel associated with the channel on which the program from which the program specifying information has been extracted is broadcast, or programs that will be broadcast on all channels.

The program specifying information may include broadcast start information indicating a broadcast start time and date. The specifying means may specify, as the program to be timer-recorded, a program that starts broadcasting at the time and date indicated by the broadcast start information.

The program specifying information may further include content information indicating content of the program. The specifying means may specify, as the program to be timer-recorded, a program that starts broadcasting at the time and date indicated by the broadcast start information and that has content indicated by the content information.

The specifying means may specify, as the program to be timer-recorded, a program whose electronic program guide information includes at least a certain amount of information indicated by the content information.

According to an embodiment of the present invention, there is provided an information processing method for an information processing apparatus for controlling programming of a timer recording of a specific television broadcast program. The information processing method includes the steps of: extracting program specifying information from audio data or video data of a program; specifying a program to be timer-recorded on the basis of the extracted program specifying information; presenting information for prompting a user to program a timer recording of the specified program; and accepting the programmed timer recording of the specified program.

According to an embodiment of the present invention, there is provided a program for causing a computer to perform information processing for controlling programming of a timer recording of a specific television broadcast program. The information processing includes the steps of: extracting program specifying information from audio data or video data of a program; specifying a program to be timer-recorded on the basis of the extracted program specifying information; presenting information for prompting a user to program a timer recording of the specified program; and accepting the programmed timer recording of the specified program.

According to the information processing apparatus, the information processing method, or the program of the embodiment of the present invention, program specifying information is extracted from audio data or video data of a program. A program to be timer-recorded is specified on the basis of the extracted program specifying information. Information for prompting a user to program a timer recording of the specified program is presented. The timer recording of the specified program is accepted.

According to the embodiment of the present invention, a timer recording of a specific program can be easily programmed.

DESCRIPTION OF THE PREFERRED EMBODIMENTS

Before describing embodiments of the present invention, the correspondence between the features of the claims and the embodiments described with reference to the specification or the drawings is discussed below. This description is intended to assure that embodiments supporting the claimed invention are described in this specification or the drawings. Thus, even if an embodiment described in this specification or drawings is not described as relating to a certain feature of the present invention, that does not necessarily mean that the embodiment does not relate to that feature of the claims. Conversely, even if an embodiment is described herein as relating to a certain feature of the claims, that does not necessarily mean that the embodiment does not relate to other features of the claims.

Figure 6:
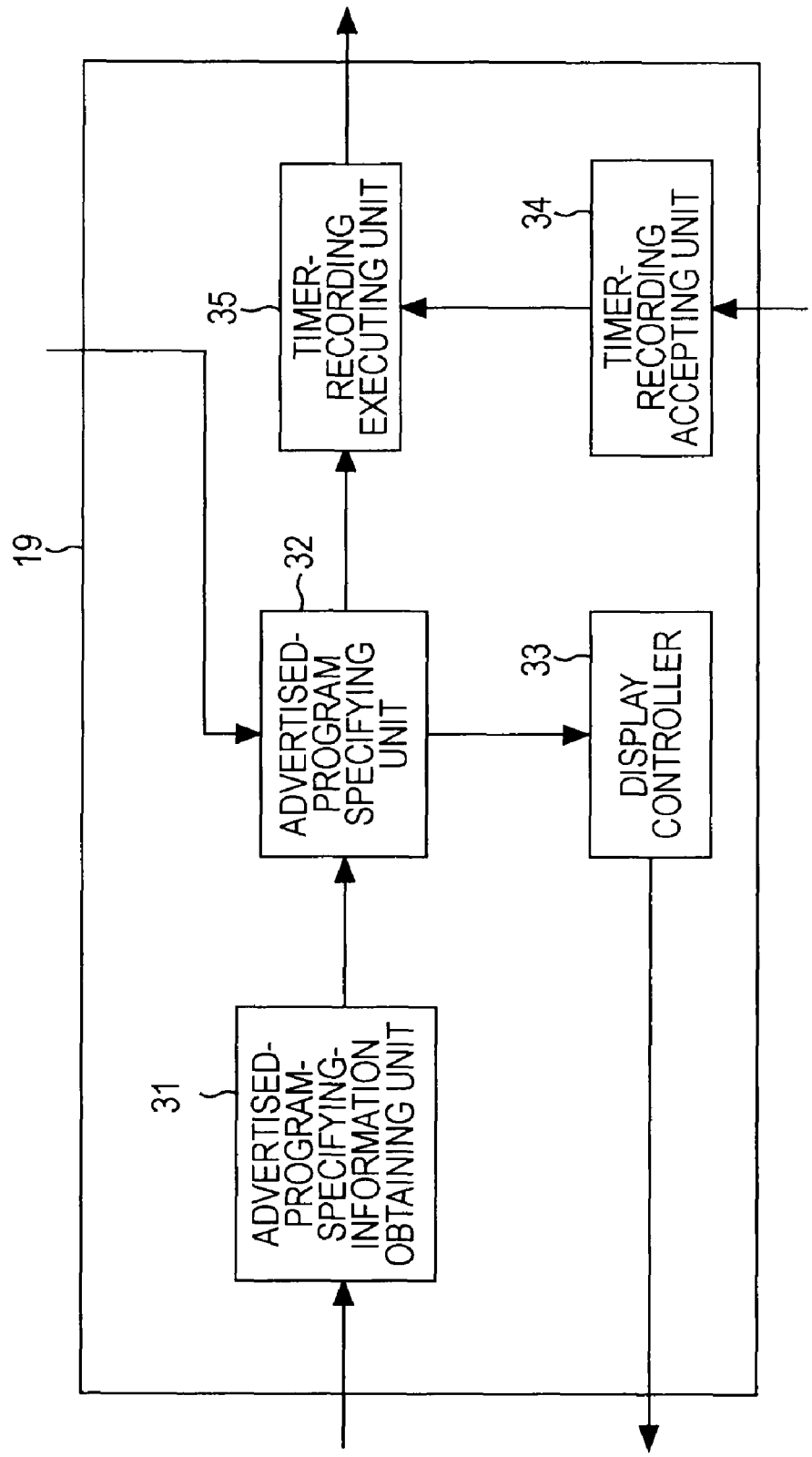
FIG. 6 is a block diagram of an exemplary structure of a reception controller shown in FIG. 5.

An information processing apparatus according to an embodiment of the present invention is an information processing apparatus (e.g., a television receiver 1 shown in FIG. 1) for controlling programming of a timer recording of a specific television broadcast program, including the following elements: extracting means (e.g., an advertised-program-specifying-information obtaining unit 31 shown in FIG. 6) for extracting program specifying information from audio data or video data of a program; specifying means (e.g., an advertised-program specifying unit 32 shown in FIG. 6) for specifying a program to be timer-recorded on the basis of the program specifying information extracted by the extracting means; presenting means (e.g., a display controller 33 shown in FIG. 6) for presenting information for prompting a user to program a timer recording of the program specified by the specifying means; and accepting means (e.g., a timer-recording accepting unit 34 and a timer-recording executing unit 35 shown in FIG. 6) for accepting the programmed timer recording of the program specified by the specifying means.

An information processing method or program according to an embodiment of the present invention is an information processing method for an information processing apparatus for controlling programming of a timer recording of a specific television broadcast program or a program for causing a computer to perform information processing for controlling programming of a timer recording of a specific television broadcast program. The method or information processing includes the steps of: extracting program specifying information from audio data or video data of a program (e.g., step S1 shown in FIG. 7); specifying a program to be timer-recorded on the basis of the extracted program specifying information (e.g., step S3 shown in FIG. 7); presenting information for prompting a user to program a timer recording of the specified program (e.g., step S5 shown in FIG. 7); and accepting the programmed timer recording of the specified program (e.g., step S7 shown in FIG. 7).

Figure 1:
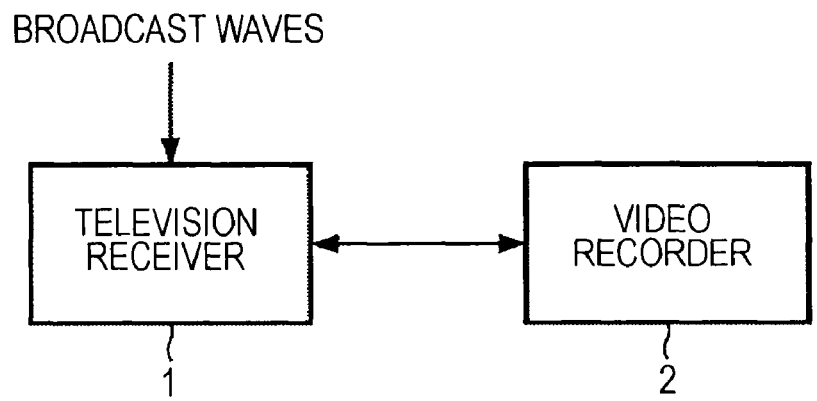
FIG. 1 is a diagram of an exemplary application of a television receiver and a video recorder according to an embodiment of the present invention.

FIG. 1 illustrates an exemplary application of a television receiver 1 and a video recorder 2 according to an embodiment of the present invention.

The television receiver 1 receives, for example, as in general television receivers, broadcast waves of digital television broadcasting, reproduces the received broadcast waves, and displays images on a display (not shown).

The television receiver 1 also extracts, from audio data and/or video data of a program currently being broadcast, predetermined information that is used to introduce an advertised program in a program commercial, such as the broadcast start time and date of the advertised program, and that can specify the advertised program (hereinafter referred to as "advertised-program specifying information"), and specifies the advertised program on the basis of the extracted advertised-program specifying information.

Having specified the advertised program, the television receiver 1 presents to a viewer information for prompting the viewer to program a timer recording of the advertised program. In response to the presented information, the viewer programs a timer recording of the advertised program, which is then accepted. The television receiver 1 sets the video recorder 2 to perform a timer recording of the advertised program and causes the video recorder 2 to execute recording.

Figure 2:
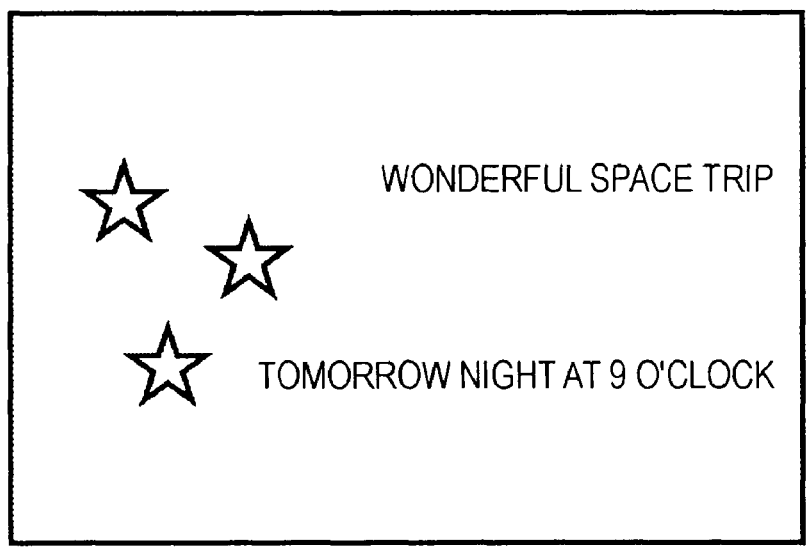
FIG. 2 illustrates an example of a video image of a program commercial.

For example, when a program commercial displaying a video image shown in FIG. 2 is being broadcast, information indicating the title of the program "Wonderful Space Trip" and information indicating the broadcast start time and date "Tomorrow night at 9 o'clock" are extracted as advertised-program specifying information from the video image. On the basis of the advertised-program specifying information, it is specified that the program whose title is "Wonderful Space Trip" and which will be broadcast at "Tomorrow night at 9 o'clock" is specified as the advertised program.

Figure 3:
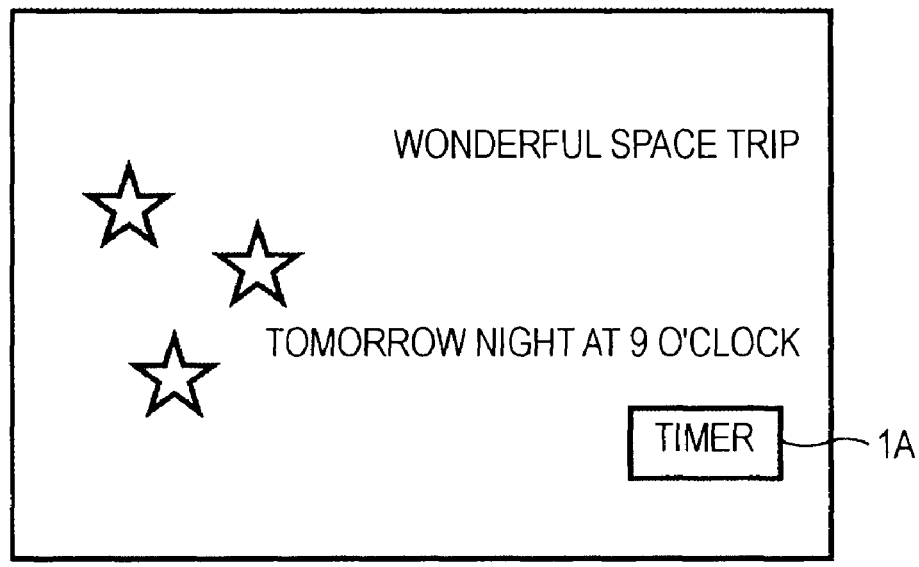
FIG. 3 illustrates an example of a displayed video image represented by preset capability information.
Figure 4:
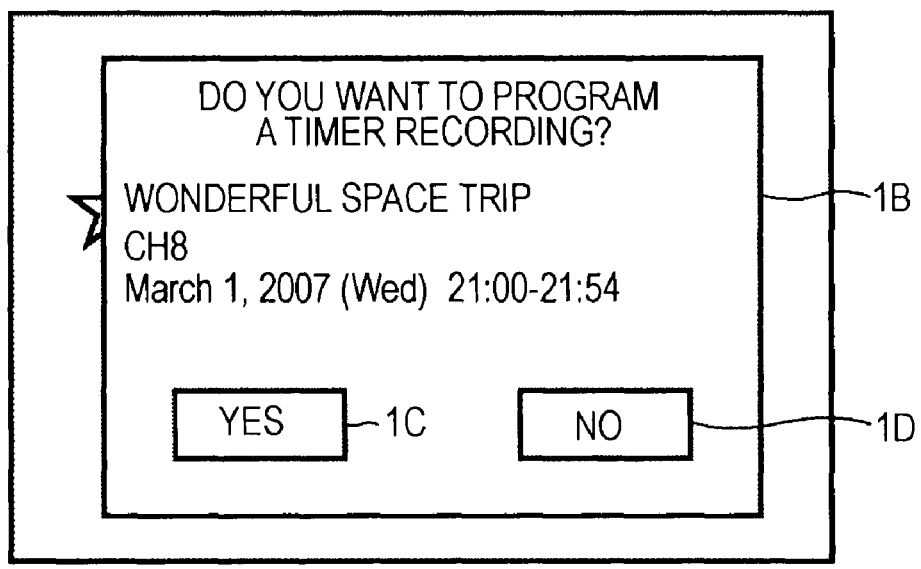
FIG. 4 illustrates another example of a displayed video image represented by preset capability information.

When the advertised program is specified, for example, information for prompting the viewer or user to program a timer recording of the advertised program (hereinafter referred to as "preset capability information") is superimposed on the video image of the program commercial and is displayed, as shown in FIGS. 3 and 4.

A timer recording button 1A shown in FIG. 3 is displayed at first. When the user selects the timer recording button 1A, a timer-recording accepting screen 1B shown in FIG. 4 is displayed.

When an accepting button 1C of the timer-recording accepting screen 1B is operated, a timer recording of the program "Wonderful Space Trip" is set.

Figure 5:
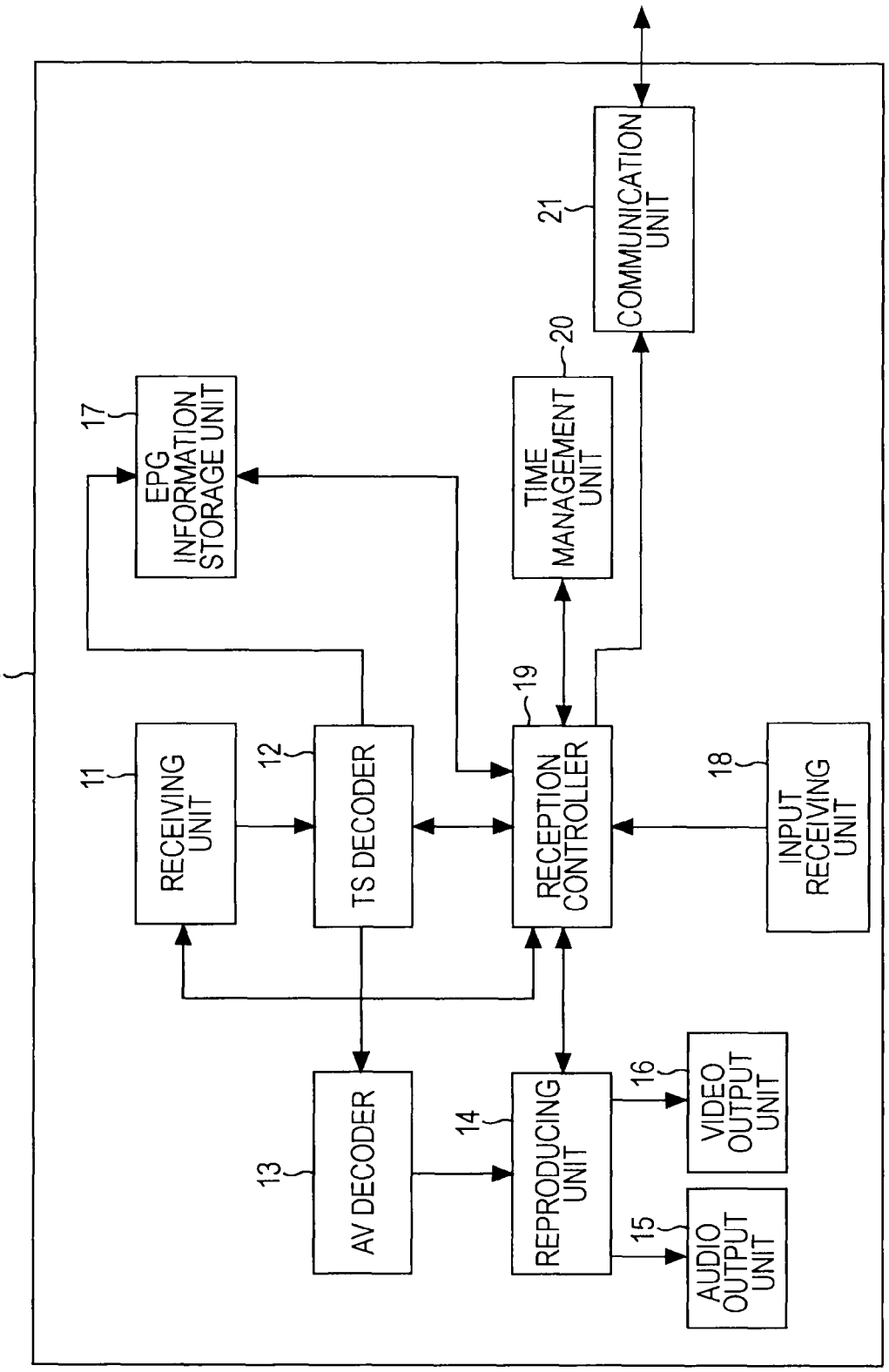
FIG. 5 is a block diagram of an exemplary structure of the television receiver shown in FIG. 1.

FIG. 5 illustrates an exemplary structure of the television receiver 1.

A receiving unit 11 receives transport streams sent via broadcast channels and supplies specific transport streams specified by a reception controller 19 to a transport stream (TS) decoder 12.

The TS decoder 12 extracts electronic program guide (EPG) information from the transport streams supplied by the receiving unit 11 and supplies the EPG information to an EPG information storage unit 17. The EPG information storage unit 17 stores the EPG information.

In addition, the TS decoder 12 extracts, from the transport streams supplied by the receiving unit 11, program data of the channel specified by the reception controller 19 and outputs the program data to an audio/video (AV) decoder 13.

The AV decoder 13 decodes the program data received from the TS decoder 12 and outputs the decoded program data to a reproducing unit 14.

Under control of the reception controller 19, the reproducing unit 14 separates the program data decoded by the AV decoder 13 into audio data and video data.

The reproducing unit 14 converts the separated audio data into an audio signal and outputs the audio signal to an audio output unit 15. At the same time, the reproducing unit 14 converts the separated video data into a video signal and outputs the video signal in synchronization with the audio signal to a video output unit 16. The reproducing unit 14 supplies the separated audio data and video data to the reception controller 19.

When image data is supplied from the reception controller 19 as display element information of the preset capability information, the reproducing unit 14 superimposes the image data onto the video data supplied from the AV decoder 13, converts the data into a video signal, and outputs the video signal to the video output unit 16.

The audio output unit 15 outputs the digital audio signal received from the reproducing unit 14 to an external loudspeaker (not shown) without changing it or by converting it into an analog audio signal. The video output unit 16 converts the digital video signal received from the reproducing unit 14 into an analog video signal in accordance with, for example, the National Television System Committee (NTSC) format or the phase alternation line (PAL) format and outputs the analog video signal to an external display (not shown) such as a cathode-ray tube (CRT).

An input receiving unit 18 receives an operation instruction from a remote controller or the like and sends the operation instruction to the reception controller 19.

The reception controller 19 includes a central processing unit (CPU), a read-only memory (ROM) storing a control program for controlling reception of transport streams and for controlling a process of programming a recording of an advertised program, and a random access memory (RAM) serving as a work storage area. In accordance with the control program, the reception controller 19 performs predetermined processes. The structure of the reception controller 19 is described later as a processing operation performed in accordance with the control program.

A time management unit 20 manages time. In response to a time query from the reception controller 19, the time management unit 20 sends a notification of the current time to the reception controller 19. The time includes information indicating time, date, and year. Time management may be performed by the time management unit 20 by extracting a time date table (TDT) multiplexed in a transport stream using the TS decoder 12, receiving the TDT via the reception controller 19, and measuring time on the basis of the TDT. Alternatively, the current time can be measured using a built-in clock.

Under control of the reception controller 19, a communication unit 21 communicates with the video recorder 2 and causes the video recorder 2 to execute recording of an advertised program that has been programmed to be recorded.

FIG. 6 illustrates an exemplary structure of the reception controller 19 shown in FIG. 5.

An advertised-program-specifying-information obtaining unit (hereinafter abbreviated as an "obtaining unit") 31 performs a process of obtaining advertised-program specifying information from the audio data and/or video data supplied from the reproducing unit 14. When advertised-program specifying information is obtained, the obtaining unit 31 supplies the advertised-program specifying information to an advertised-program specifying unit 32.

The advertised-program specifying unit 32 refers to the EPG information stored in the EPG information storage unit 17 and determines the presence of a program having the EPG information including the advertised-program specifying information supplied from the obtaining unit 31. If such a program exists, the advertised-program specifying unit 32 specifies the program as the advertised program.

When the advertised program is specified, the advertised-program specifying unit 32 supplies preset capability information for prompting a user to program a timer recording of the advertised program to a display controller 33 and supplies information necessary for programming a timer recording of the advertised program, such as the channel and the broadcast start and end time of the advertised program (hereinafter referred to as "timer-recording executing information") to a timer-recording executing unit 35.

When the preset capability information is supplied from the advertised-program specifying unit 32, the display controller 33 outputs image data serving as display element information of the preset capability information to the reproducing unit 14. The reproducing unit 14 superimposes the image data supplied from the display controller 33 of the reception controller 19 onto video data obtained from the AV decoder 13, converts the data into a video signal, and outputs the video signal to the video output unit 16.

A timer-recording accepting unit 34 accepts a timer recording of the advertised program via, for example, the timer-recording accepting screen 1B shown in FIG. 4, which is displayed using the display controller 33, and sends a notification that the timer recording has been accepted to the timer-recording executing unit 35.

When the notification that the timer recording of the advertised program has been accepted is sent from the timer-recording accepting unit 34 to the timer-recording executing unit 35, the timer-recording executing unit 35 controls the communication unit 21 to set the video recorder 2 to perform a timer recording of the advertised program on the basis of the timer-recording executing information supplied from the advertised-program specifying unit 32.

Figure 7:
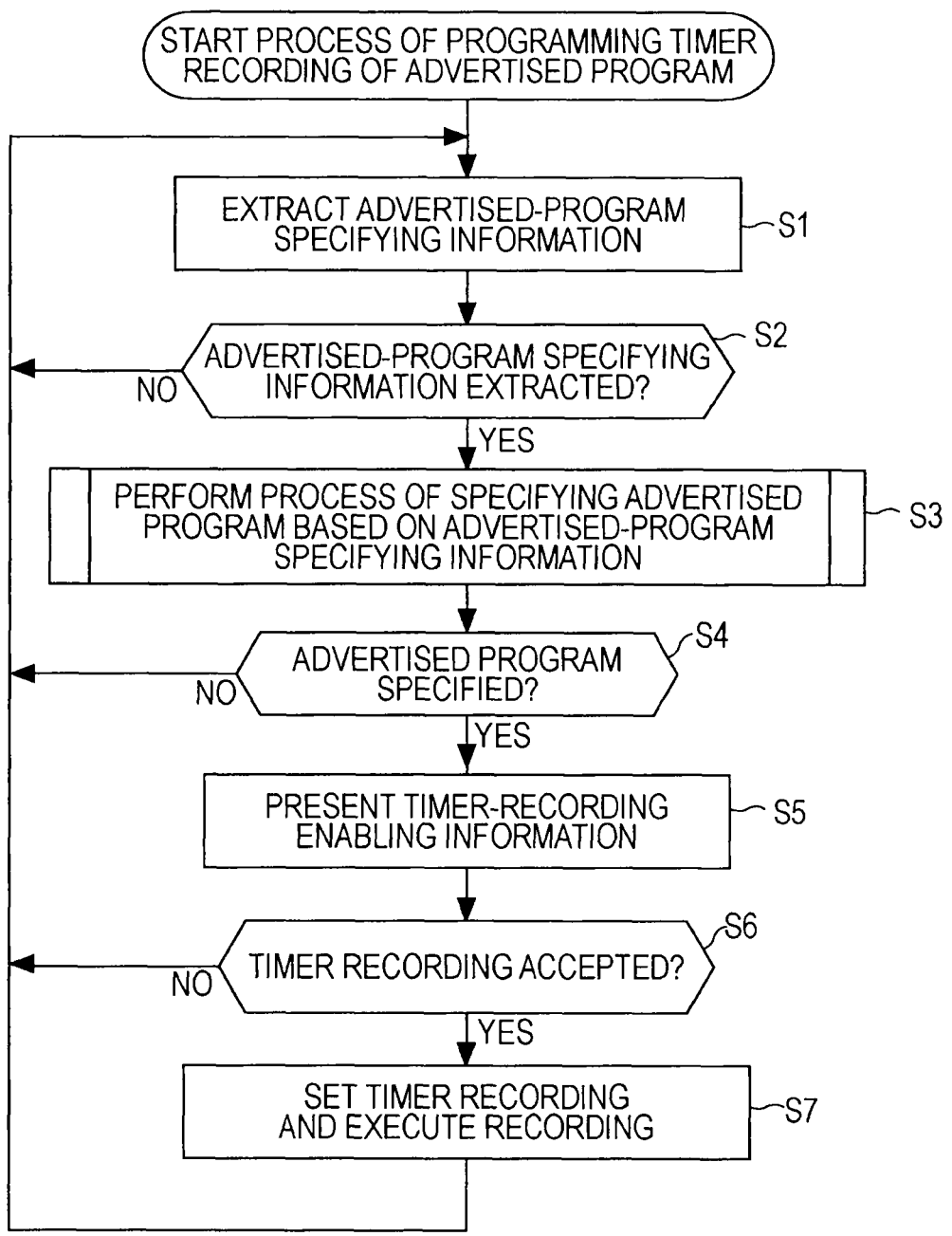
FIG. 7 is a flowchart of a process of programming a timer recording of an advertised program.

Referring now to the flowchart of FIG. 7, a process of programming a timer recording of an advertised program using the television receiver 1 is described.

In step S1, the obtaining unit 31 of the reception controller 19 performs a process of extracting advertised-program specifying information from audio data and/or video data supplied from the reproducing unit 14.

More specifically, a general program commercial includes a video and audio output including an image displaying, for example, the title of an advertised program ("Wonderful Space Trip" in the example shown in FIG. 2) and the broadcast start time and date ("Tomorrow night at 9 o'clock" in the example shown in FIG. 2). The obtaining unit 31 tries to obtain the title and the broadcast start time and date of the program by performing an audio recognition process and/or a character pattern recognition process on the audio data and/or video data supplied from the reproducing unit 14 to recognize characters and words constituting the title and the broadcast start time and date of the program.

Characters constituting information indicating the broadcast start time and date include, for example, "night", "tonight", "this week", "date", "day", "time", "AM", "PM", "tomorrow", and "Near Year's day", which are case-insensitive, and variations thereof within a specific range.

In step S2, the obtaining unit 31 determines whether advertised-program specifying information has been extracted. When it is determined that no advertised-program specifying information has been extracted, the flow returns to step S1, and the obtaining unit 31 extracts advertised-program specifying information from audio data and/or video data supplied from the reproducing unit 14.

When it is determined in step S2 that advertised-program specifying information has been extracted, the obtaining unit 31 supplies, in step S3, the extracted advertised-program specifying information to the advertised-program specifying unit 32. On the basis of the supplied advertised-program specifying information, the advertised-program specifying unit 32 performs a process of specifying the advertised program.

Figure 8:
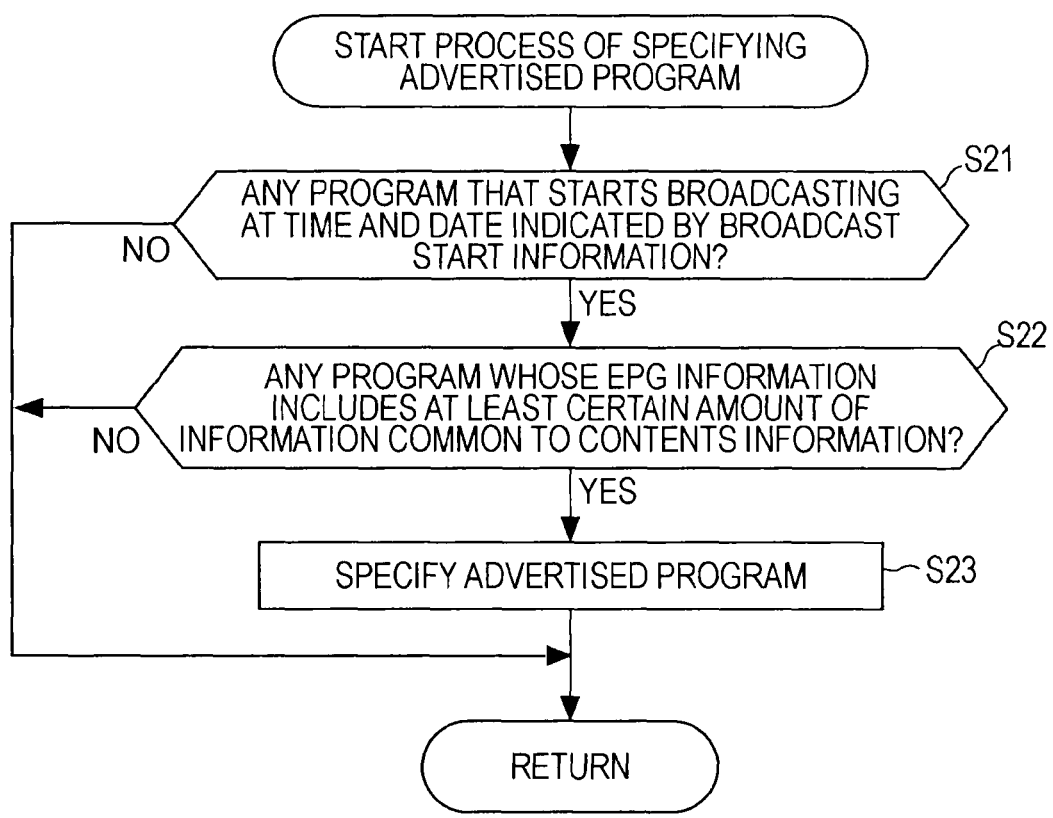
FIG. 8 is a flowchart of the details of the process shown in FIG. 7 in which a process of specifying the advertised program is performed in step S3.

More specifically, a process shown in the flowchart of FIG. 8 is performed. That is, in step S21, the advertised-program specifying unit 32 determines, by referring to the EPG information stored in the EPG information storage unit 17, whether information indicating the broadcast start time and date (hereinafter referred to as "broadcast start information") is included in the advertised-program specifying information supplied from the obtaining unit 31 and determines whether programs that start broadcasting at the time and date indicated by the broadcast start information exist.

Since the advertised program is generally broadcast on the same channel as the program commercial, a search can be conducted on programs that will be broadcast on the channel on which the program commercial is being broadcast.

For example, when associated channels are available, such as in the case of Nippon Hoso Kyokai (NHK; registered trademark) having a general channel and an educational channel, a search can be conducted on programs that will be broadcast on the associated channels. Alternatively, a search can be conducted on programs that will be broadcast on all channels.

When it is determined in step S21 that programs that start broadcasting at the time and date indicated by the broadcast start information exist, the advertised-program specifying unit 32 determines, in step S22, whether information indicating the content of the program (hereinafter referred to as "content information") is included in the advertised-program specifying information and determines the presence of, among the programs that start broadcasting at the time and date indicated by the broadcast start information, a program whose EPG information includes at least a certain amount of information common to the content information.

When it is determined in step S22 that a program whose EPG information includes at least the certain amount of information common to the content information exists, the flow proceeds to step S23. For example, when there is a program whose title includes characters indicated by the content information, the flow proceeds to step S23.

In step S23, the advertised-program specifying unit 32 specifies the program whose EPG information includes at least the certain amount of information common to the content information as the advertised program.

When it is determined in step S21 that there are no programs that start broadcasting at the time and date indicated by the broadcast start information, when it is determined in step S22 that there is no program whose EPG information includes at least the certain amount of information common to the content information, or when the advertised program is specified in step S23, the process of specifying the advertised program is terminated, and the process proceeds to step S4 of FIG. 7.

In step s4, the advertised-program specifying unit 32 determines whether the advertised program has been specified. When it is determined that specifying of the advertised program has failed (that is, when the determination is negative in step S21 or S22 of FIG. 8), the flow returns to step S1, and the process from step S1 onward is similarly performed.

When it is determined in step S4 that the advertised program has been specified (that is, when the advertised program is specified in step S23 of FIG. 8), the advertised-program specifying unit 32 supplies, in step S5, preset capability information for prompting a user to program a timer recording of the advertised program to the display controller 33. As a result, the timer recording button 1A shown in FIG. 3 is displayed at first. When the user selects the timer recording button 1A by operating an operation unit (not shown), the timer-recording accepting screen 1B shown in FIG. 4 is displayed.

In step S6, the timer-recording accepting unit 34 determines, for example, whether the accepting button 1C of the timer-recording accepting screen 1B shown in FIG. 4 has been operated and an instruction to program a timer recording of the advertised program has been entered from the input receiving unit 18. When it is determined that the instruction has been entered, in step S7, the timer-recording accepting unit 34 accepts the timer recording and sends a notification that the timer recording has been accepted to the timer-recording executing unit 35. On the basis of the timer-recording executing information supplied from the advertised-program specifying unit 32, the timer-recording executing unit 35 enables the video recorder 2 to operate and programs the video recorder 2 to perform a timer recording of the advertised program.

More specifically, the timer-recording executing unit 35 switches on the video recorder 2, programs a timer recording of the advertised program on the basis of the information indicating the broadcast time and date included in preset recording information, and switches off the video recorder 2.

Thereafter, the flow returns to step S1, and the process from step S1 onward is performed in a similar manner. When it is determined in step S6 that, for example, a cancel button 1D of the timer-recording accepting screen 1B shown in FIG. 4 has been operated and no instruction to program a timer recording of the advertised program has been entered, the flow returns to step S1.

Since a timer recording of an advertised program is automatically programmed in the foregoing manner, the viewer can recognize whether a timer recording of a certain advertised program can be programmed by viewing an image shown in FIG. 3 or 4, which is superimposed on a program commercial, and can easily program a timer recording of that advertised program. For broadcasters, there are increased chances of advertised programs to be viewed without performing any special tasks.

In the foregoing example, when the advertised program is specified, as shown in FIG. 3, the small timer recording button 1A is superimposed on a video image of the program and displayed. The timer recording button 1A may be indicated in any manner as long as it can be recognized by the viewer or user that a timer recording of the advertised program can be programmed. Alternatively, for example, a mark such as a star shape may be displayed. This indication of the timer recording button 1A may be deleted when no operation is entered within a specific time. By presenting preset capability information in a manner that does not disturb viewing of programs, even when a wrong program is specified as the advertised program, the inconvenience of the viewer can be reduced to minimum. Alternatively, preset capability information may be output as sound.

Alternatively, the timer recording button 1A shown in FIG. 3 may not be displayed, and the timer-recording accepting screen 1B shown in FIG. 4 may be displayed. For example, it is assumed that a plurality of programs may be specified as the advertised program. In such a case, the timer-recording accepting screen 1B including a list of information of the plurality of programs specified as the advertised program can be displayed.

Audio data and/or video data of a program are analyzed to extract advertised-program specifying information, and an advertised program is specified on the basis of the extracted advertised-program specifying information, as has been described above. Therefore, for example, even when a person participating in a variety show, instead of a program commercial, introduces a certain program orally or by using on-screen graphics, the certain program can be specified as the advertised program and a timer recording of the certain program can be accepted.

The foregoing description concerns the case where an advertised program is specified on the basis of audio data and/or video data of a program currently being broadcast and a timer recording of the advertised program is programmed. Alternatively, an advertised program can be specified on the basis of audio data and/or video data of a recorded program, and a timer recording of the advertised program can be programmed. In this case, in the determination performed in step S21 of FIG. 8 where the presence of programs that start broadcasting at the time and date indicated by the broadcast start information is determined, when broadcast start information indicating no specific broadcast time and date is obtained, as in "tomorrow night at 9 o'clock", the broadcast start time and date is necessary to be set on the basis of the recording time and date serving as the starting point. In the case of "tomorrow night at 9 o'clock", the broadcast start date is the following day of the recording date.

In the foregoing description, even when it is determined that there are programs that start broadcasting at the time and date specified by the broadcast start information (step S21 of FIG. 8), it is determined whether a program whose EPG information includes at least the certain amount of information common to the content information exists. That is, specification of the advertised program is double-checked using the EPG information. Alternatively, the advertised program can be specified only on the basis of the broadcast start information, without performing double-check based on the EPG information.

Double-checking using the EPG information may be performed by determining whether there is a program whose EPG information contains at least the certain amount of information common to the content information. Alternatively, for example, a program introduced in a program commercial generally has at least a certain broadcast duration (for example, a broadcast duration of one hour or longer). When the broadcast duration of a program is shorter than the certain duration (such as 15 minutes), the program may not be specified as the advertised program.

In the foregoing description, it is assumed that digital broadcasting is performed, and EPG information is extracted from broadcast waves. Alternatively, EPG information may be obtained from a specific server via a network. Furthermore, the embodiment of the present invention is applicable to analog broadcasting.

In the foregoing description, an advertised program is specified, and, when a specific operation is entered, a timer recording of the advertised program is accepted. Alternatively, when a timer recording of another program has already been programmed at the same time as the advertised program, a notification thereof may be displayed to prompt the user to, for example, cancel the previously-programmed timer recording.

The foregoing description does not concern timing of performing the process of programming a timer recording of an advertised program (FIG. 7). However, the process may be started at the same time as the television receiver 1 is switched on. Alternatively, the process can be performed or terminated according to specific operations entered by the user using the operation unit.

In the foregoing description, the television receiver 1 performs the process of programming a timer recording of an advertised program. Alternatively, when the video recorder 2 can receive television broadcast programs, the video recorder 2 may perform the process of programming a timer recording of an advertised program.

It is not necessary for broadcasters to perform any task relating to the above-described process of programming a timer recording of an advertised program. Since the foregoing advertised-program timer recording process brings a great advantage for the broadcasters that there are increased chances of advertised programs to be viewed, the broadcasters may embed quick response (QR) codes indicating items of information of advertised programs into program data so that the advertised programs can be more accurately specified by performing the foregoing advertised-program timer recording process. The television receiver 1 may detect the QR codes and specify the advertised programs on the basis of information indicated by the QR codes.

Figure 9:
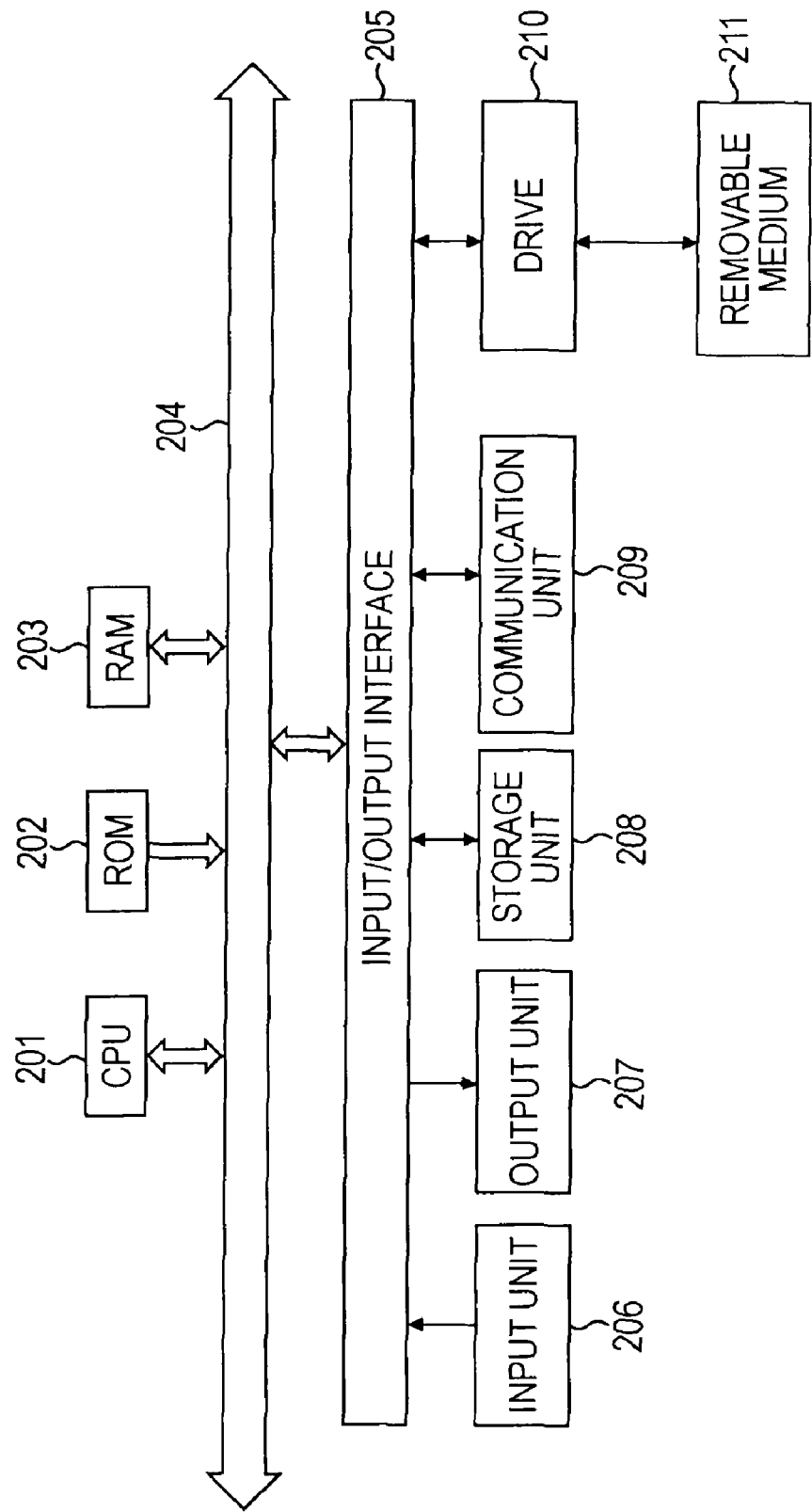
FIG. 9 is a block diagram of an exemplary structure of a personal computer.

FIG. 9 is a block diagram of an exemplary hardware structure of a computer that performs the foregoing series of processes in accordance with a program.

In the computer, a CPU 201, a ROM 202, and a RAM 203 are interconnected by a bus 204.

The bus 204 is further connected to an input/output interface 205. The input/output interface 205 is connected to an input unit 206 including a keyboard, a mouse, and a microphone, an output unit 207 including a display and a loudspeaker, a storage unit 208 including a hard disk and a nonvolatile memory, a communication unit 209 including a network interface or the like, and a drive 210 for driving a removable medium 211 such as a magnetic disk, an optical disk, a magneto-optical disk, a semiconductor memory, or the like.

In the computer with the foregoing structure, for example, the CPU 201 loads a program stored in the storage unit 208 into the RAM 203 via the input/output interface 205 and the bus 204 and executes the program, thereby performing the above-described series of processes.

The program executed by the computer (CPU 201) is provided by recording it in the removable medium 211, which is a packaged medium including a magnetic disk (including a flexible disk), an optical disk (including a compact disc read-only memory (CD-ROM), a digital versatile disc (DVD), and the like), a magneto-optical disk, or a semiconductor memory or by transferring it via wired transmission medium such as a local area network (LAN) or the Internet or via wireless transmission medium using digital satellite broadcasting.

By mounting the removable medium 211 onto the drive 210, the program can be installed in the storage unit 208 via the input/output interface 205. Alternatively, the program can be transferred via wired or wireless transmission medium to the communication unit 209, and the communication unit 209 receives the transferred program and installs the program into the storage unit 208. Alternatively, the program can be installed in advance in the ROM 202 or the storage unit 208.

The program executed by the computer may be a program defining processes that are performed time sequentially according to the description, or processes that are performed in parallel or at a necessary timing, such as when the program is called.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for controlling programming of a timer recording of, comprising:
   means for receiving a plurality of television programs including audio data and video data, at least one of the plurality of television programs corresponding to a specific television broadcast program;
   means for reproducing the one of the plurality of television programs and associated audio data and video data corresponding to the specific television broadcast program;
   means for extracting program specifying information from the audio data or the video data included in the one of the plurality of television programs corresponding to the specific television broadcast program being currently reproduced by the means for reproducing;
   means for specifying the television broadcast program to be timer-recorded on the basis of the program specifying information extracted by the means for extracting;
   means for displaying information for prompting a user to program a timer recording of the television broadcast program specified by the means for specifying while the means for reproducing reproduces the one of the plurality of television programs corresponding to the specific television broadcast program; and
   means for accepting the programmed timer recording of the television broadcast program specified by the means for specifying.

2. The information processing apparatus according to claim 1, wherein the means for specifying searches for the program to be timer-recorded from among programs that will be broadcast on a channel on which the program from which the program specifying information has been extracted is broadcast, programs that will be broadcast on a channel associated with the channel on which the program from which the program specifying information has been extracted is broadcast, or programs that will be broadcast on all channels.

3. The information processing apparatus according to claim 1, wherein the program specifying information includes broadcast start information indicating a broadcast start time and date, and
   wherein the means for specifying specifies, as the program to be timer-recorded, a program that starts broadcasting at the time and date indicated by the broadcast start information.

4. The information processing apparatus according to claim 3, wherein the program specifying information further includes content information indicating content of the program, and
   wherein the means for specifying specifies, as the program to be timer-recorded, a program that starts broadcasting at the time and date indicated by the broadcast start information and that has content indicated by the content information.

5. The information processing apparatus according to claim 4, wherein the means for specifying specifies, as the program to be timer-recorded, a program whose electronic program guide information includes at least a certain amount of information indicated by the content information.

6. The information apparatus according to claim 1, wherein the one of the plurality of television programs is an advertisement for the program specified by the means for specifying.

7. The information apparatus according to claim 1, wherein the information for prompting the user to program the timer recording is superimposed over the one of the plurality of television programs being reproduced.

8. An information processing method for an information processing apparatus for controlling programming of a timer recording, comprising:
   receiving a plurality of television programs including audio data and video data, at least one of the plurality of television programs corresponding to a specific television broadcast program;
   reproducing, on a display unit, the one of the plurality of television programs and associated audio data and video data corresponding to the specific television broadcast program;
   extracting program specifying information from the audio data or the video data included in the one of the plurality of television programs corresponding to the specific television broadcast program being currently reproduced;
   specifying the television broadcast program to be timer-recorded on the basis of the extracted program specifying information;
   displaying, on the display unit, information for prompting a user to program a timer recording of the specified television broadcast program while reproducing the one of the plurality of television programs corresponding to the specific television broadcast program; and
   accepting the programmed timer recording of the specified television broadcast program.

9. A nontransitory computer readable storage medium having stored thereon a computer program for causing a computer to perform information processing for controlling programming of a timer recording, the information processing comprising:
   receiving a plurality of television programs including audio data and video data, at least one of the plurality of television programs corresponding to a specific television broadcast program;

reproducing, on a display unit, the one of the plurality of television programs and associated audio data and video data corresponding to the specific television broadcast program;

extracting program specifying information from the audio data or the video data included in the one of the plurality of television programs corresponding to the specific television broadcast program being currently reproduced;

specifying the television broadcast program to be timer-recorded on the basis of the extracted program specifying information;

displaying, on the display unit, information for prompting a user to program a timer recording of the specified television broadcast program while reproducing the one of the plurality of television programs corresponding to the specific television broadcast program; and accepting the programmed timer recording of the specified television broadcast program.

10. An information processing apparatus for controlling programming of a timer recording, comprising:

a receiving unit configured to receive a plurality of television programs including audio data and video data, at least one of the plurality of television programs corresponding to a specific television broadcast program;

reproducing, on a display unit, the one of the plurality of television programs and associated audio data and video data corresponding to the specific television broadcast program;

an extracting unit configured to extract program specifying information from the audio data or the video data included in the one of the plurality of television programs corresponding to the specific television broadcast program being currently reproduced;

a specifying unit configured to specify the television broadcast program to be timer-recorded on the basis of the program specifying information extracted by the extracting unit;

the display unit being configured to display information for prompting a user to program a timer recording of the television broadcast program specified by the specifying unit while reproducing the one of the plurality of television programs corresponding to the specific television broadcast program; and an accepting unit configured to accept the programmed timer recording of the television broadcast program specified by the specifying unit.

* * * * *